Jan. 11, 1938.  R. SLABY  2,105,434
MOTOR VEHICLE
Filed Sept. 25, 1933  4 Sheets-Sheet 2
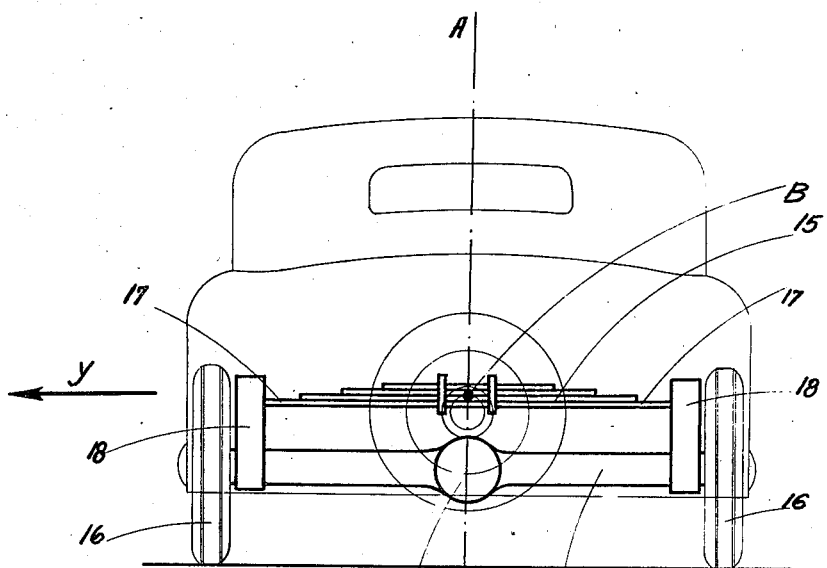
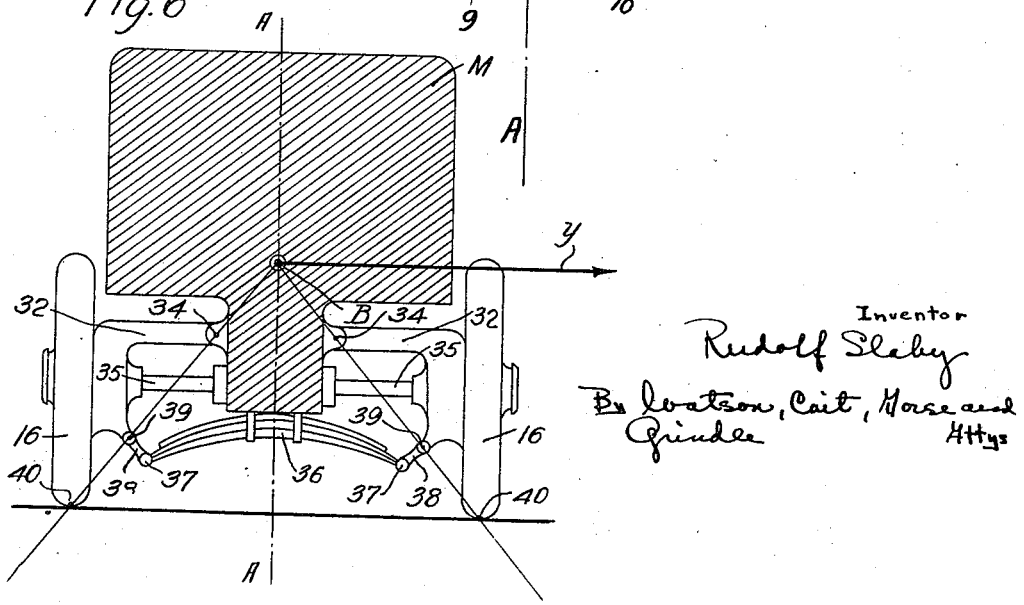

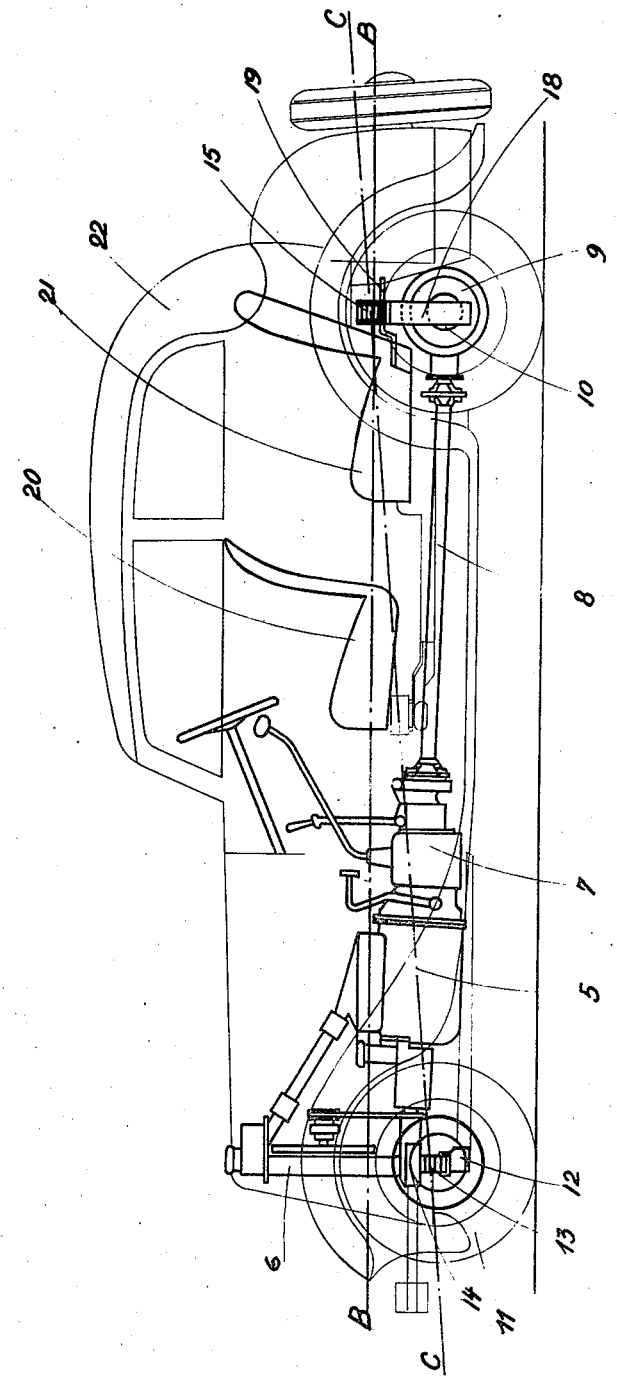

Jan. 11, 1938.        R. SLABY        2,105,434
MOTOR VEHICLE
Filed Sept. 25, 1933        4 Sheets-Sheet 3

Inventor
Rudolf Slaby
By Watson, Cait, Grose and Grindle
Attys.

Jan. 11, 1938.　　　　R. SLABY　　　　2,105,434

MOTOR VEHICLE

Filed Sept. 25, 1933　　　　4 Sheets-Sheet 4

Inventor
Rudolf Slaby
By Watson, Coit, Morse and Grindle
Attys

Patented Jan. 11, 1938

2,105,434

UNITED STATES PATENT OFFICE 2,105,434

MOTOR VEHICLE

Rudolf Slaby, Berlin-Charlottenburg, Germany, assignor to Auto Union A. G., Chemnitz, Germany, a joint-stock company of Germany Application September 25, 1933, Serial No. 690,897
In Germany September 30, 1932

6 Claims. (Cl. 280—112)

The invention relates to a motor vehicle, more particularly a spring arrangement for motor vehicles and their trailers. Heretofore, it has been customary to arrange the springs, both the longitudinal springs and the transverse springs, below the centre-of-gravity line of the vehicle. With this arrangement of the springs, an inclination of the chassis or of the vehicle body occurs on travelling round curves, such that the upper portion of the chassis or of the body inclines outwards. In other cases it has been proposed to arrange the springs above the center of gravity line of the vehicle, such that an inclination of the chassis or of the vehicle body occurs on travelling round curves and the upper portion of the chassis or of the body inclines inwardly, that is, towards the inside of the curve. These inclinations of the chassis or vehicle body cause an additional stressing of the spring. Such additional stressing could be compensated by making the springs stronger, but the spring is thereby made stiffer, so that the desired soft springing is not secured. Furthermore, the known spring arrangements result in a bad road position producing in the occupants of the motor vehicle a feeling of insecurity on travelling round curves.

According to the invention, these disadvantages are eliminated by arranging the springing of the vehicle, with respect to the sprung vehicle mass in such a manner that the axis of inclination which extends in the longitudinal direction of the vehicle and about which the sprung vehicle mass rotates under the influence of any forces extends substantially through the centre of gravity of the sprung vehicle mass, so that transverse mass forces of the sprung vehicle mass which are set up on travelling cannot cause any rotation about this axis.

In order that the invention may be more clearly understood and carried into practical effect reference is now made to the accompanying diagrammatic drawings wherein:

Figure 1 shows a motor vehicle viewed from the side.

Figure 2 shows the same vehicle viewed from the rear.

Figure 6 shows the rear view of a swinging axle vehicle.

Figure 3:
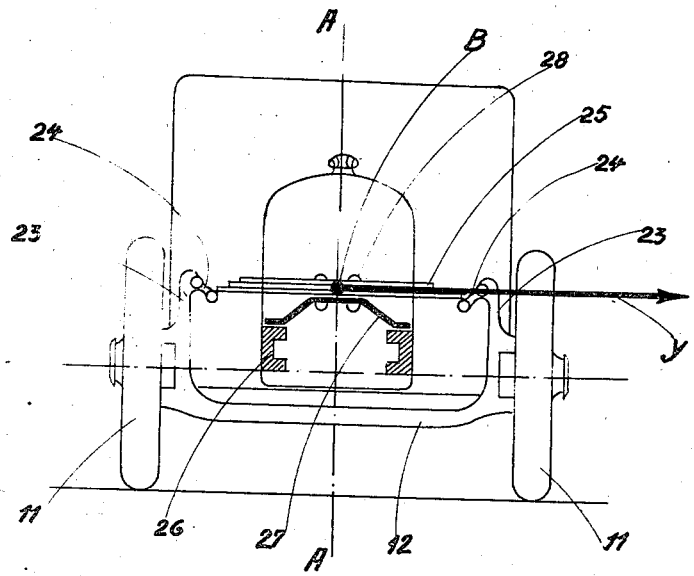
Figure 3 shows another construction viewed from the front.

Referring to Figure 1, 5 denotes the engine, 6 the radiator pertaining thereto, 7 the transmission gear, 8 the Cardan shaft, 9 the differential gear and 10 the back axle. The front wheels 11 are connected in any desired manner known per se by means of steering swivels (not shown) to the front axle 12, to which is secured by its ends the front transverse spring 13, in its turn connected in the middle of the vehicle to the front chassis frame 14. The dot-and-dash line B—B represents a centre-of-gravity line of the sprung vehicle mass. As may be seen from Figures 1 and 2, the rear spring 15 is arranged at the level of this centre-of-gravity line. The rear wheels 16 are connected together by the back axle 10 comprising the differential gear 9. The rear transverse spring is supported by its ends 17 on spring supports 18 which are secured to the ends of the back axle 10. In the middle, the spring 15 is connected to the body by suitable means, for example by the intermediate metal plate 19.

In Figure 2, the longitudinal plane of symmetry A—A of the vehicle is shown. As may be seen more particularly from Figure 2, the springing of the sprung vehicle mass is effected substantially in a horizontal plane passing through the centre-of-gravity line B. In the case of a right hand curve for example, the centrifugal force acts as shown by the arrow Y in Figure 2, that is to say, the resultant of the transverse mass forces occurring in the case of a right hand curve passes, as shown by the arrow Y, through the centre-of-gravity line B—B. Consequently the sprung mass is not capable of exerting on the springing a turning or tilting moment that could cause an oblique position of the sprung vehicle mass. This constructional example therefore shows that the object of the invention, namely the avoidance of an inclined position of the vehicle on travelling through curves is attained with certainty. In the constructional example shown in the drawings, provision has also been made that the seats 20 and 21 (see Figure 1) of the body 22 are so arranged that practically the centre of gravity of the entire sprung mass is situated at the level of the centre-of-gravity line or in its immediate vicinity.

In the constructional example shown in Figures 1 and 2, the method of springing according to the invention has only been carried out in the case of the rear spring, because it has been found that, with certain types, this kind of springing in itself produces satisfactory results in practice. A vehicle in which, as shown in Figure 1, the centre-of-gravity line B—B extends in the position shown in the drawings, but in which the front spring 13 does not lie in a plane passing through the centre-of-gravity line, and in which therefore the principle of the invention is only applied with respect to the rear spring possesses substantially improved running qualities as compared with the known vehicles. There is of course a further improvement in the effect when the principle applied to the rear spring is also applied to the front spring, which is the case when the centre-of-gravity line assumes the position C—C shown in Figure 1, since the spring arrangement according to the invention comes into consideration both for the longitudinal springs and for the transverse springs. The arrangement is particularly suitable for transverse springs, however, because it is possible to arrange these springs outside the seating space, so that there is no restriction whatever as regards the height of the spring arrangement. As is also shown in Figure 2, the transverse spring is preferably connected in the middle to the sprung vehicle mass, so that the point of attachment between the spring and sprung vehicle mass also lies in the centre-of-gravity line of the said mass.

In the constructional example according to Figure 3, the front wheels are denoted by 11 and a front axle by 12. The axle, to which the wheels are fixed in any known manner for example by means of steering swivels, is provided with upwardly extending spring supports 23, to which a transverse spring 25 is pivoted by means of spring shackles 24. The sprung vehicle mass in the present case is characterized by the frame 26 which is rigidly secured by a connecting bridge 27 to the middle of the spring 25, for example by spring stirrups 28 in known manner. The centre-of-gravity line is denoted by B in this construction also. As may be seen, the said line extends in the vertical longitudinal plane of symmetry of the vehicle. In this arrangement also, the spring lies in a plane which is perpendicular to the longitudinal plane of symmetry A—A and which extends through the centre-of-gravity line B—B. Consequently, in this case also the axis of inclination coincides with the centre-of-gravity line, so that mass forces set up on travelling through curves, for example in the case of a right hand curve, and which are applied in the centre-of-gravity line B, as shown by the arrow Y, extend in the same plane in which the spring is arranged. Consequently, in this case also, it is not possible for additional spring forces to be set up, and therefore twisting or tilting of the sprung vehicle mass is excluded.

Figure 4:
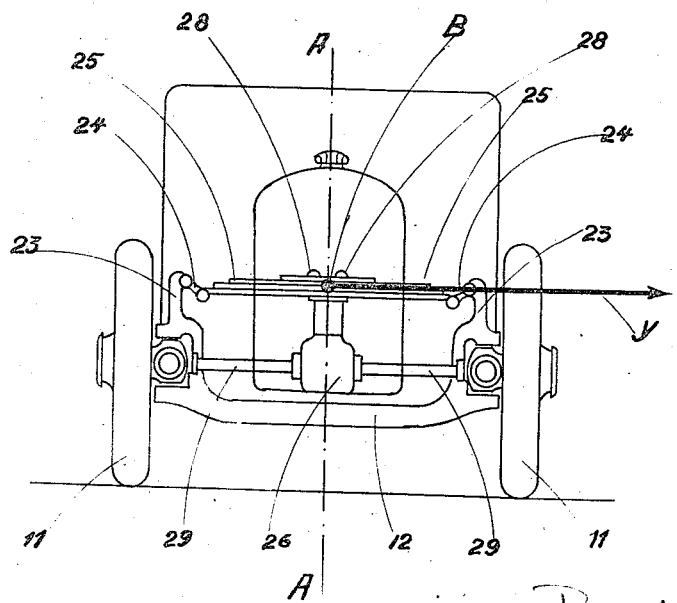
Figure 4 shows a further construction, likewise viewed from the front.

All that has been said in regard to Figure 3 also applies to Figure 4, and the same reference numerals denote the same parts. The difference merely resides in the fact that in this constructional example, the spring is connected to the engine casing 26, from which the wheels 11 are driven by two shafts 29. This figure therefore shows the application of the principle of springing according to the invention to a vehicle with front wheel drive.

Figure 5:
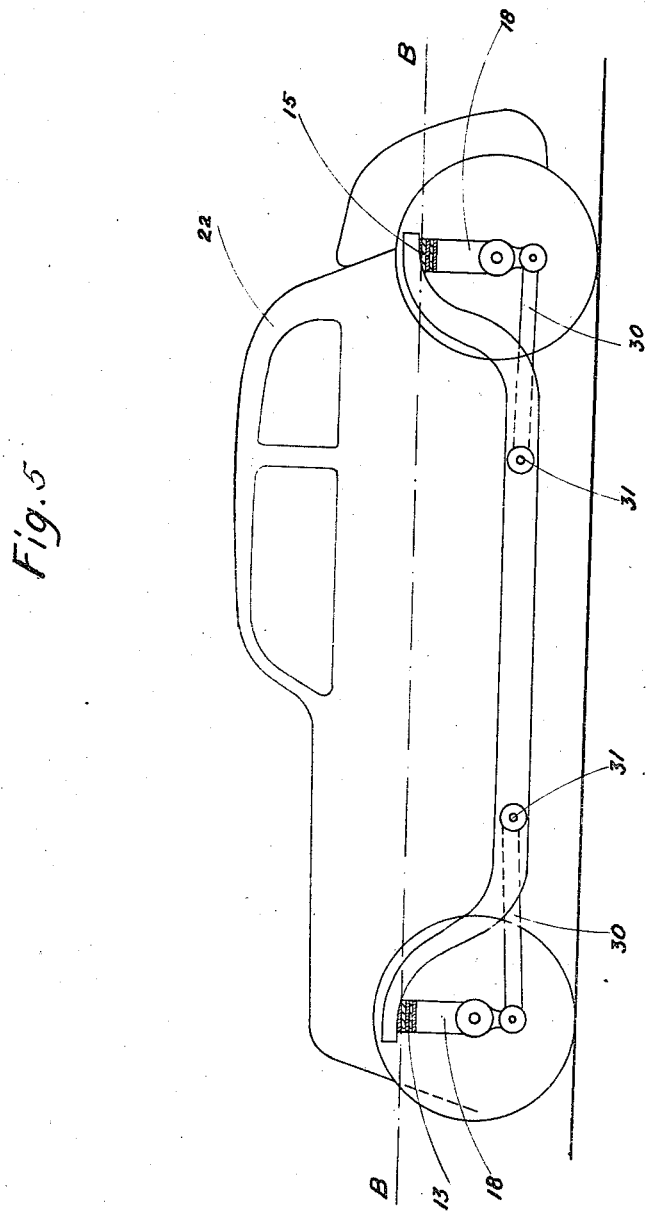
Figure 5 shows the side view of another construction.

The constructional example according to Figure 5 also corresponds substantially to the constructional example according to Figure 1, but with the difference that, in this construction, the centre-of-gravity line B—B extends substantially horizontal and that also the front spring 13 lies in a plane passing through the line B—B. In this case, as shown in Figure 2, the springs are secured to spring supports 18, connected by links 30 at the point 31 to the vehicle body.

Figure 6 shows the application of the invention to a swinging axle vehicle. The rear wheels are again denoted by 16 and, by means of the swinging lever 32 rigidly connected to them, are pivoted to the gear box 33 in the point 34. The wheels are driven by the jointed shaft 35 which issues from the gear box. To the bottom of the gear box is secured a transverse spring 36 having its free ends 37 pivoted to the wheels at 39 by intermediate links 38. The sprung vehicle mass is denoted by M, the centre-of-gravity line by B, and the points of contact of the wheels by 40. For this kind of mounting, the axis of inclination is determined as the point of intersection of the inclination axis line of the points 40 and 34. Since, as may be seen in Figure 6, this connecting line also passes through the centre-of-gravity line B, the condition that the transverse mass forces shall not be able to twist the sprung vehicle mass is also satisfied for this construction of the invention.

The invention is not confined to the constructional examples shown. It is true that its application to vehicles with transverse springs is particularly favourable, but this does not exclude the application of the principle of springing to longitudinal springs. What is essential is that the sprung vehicle mass is so constructed by means of a suitable arrangement of the springs with respect to the sprung mass that the transverse forces set up when travelling do not produce any twisting of the sprung mass about the axis of inclination extending in the longitudinal direction of the vehicle.

It is clear that the object of the invention is attained in the most perfect manner when the springing is effected exactly in the centre-of-gravity line, but that slight deviations from this arrangement are admissible without fundamentally altering the principle of the invention. It will nevertheless be understood that as described in the specification and defined in the appended claims, the invention contemplates a construction such that substantial coincidence occurs between the axis of inclination and the center of gravity of the vehicle when the latter is normally loaded.

I claim:

1. In a motor vehicle consisting of sprung and unsprung portions, the combination with spring suspension means adjacent the forward and rearward ends of the vehicle, of connections between said means and the unsprung and sprung portions of the vehicle, said connections being so constructed and disposed as to support the sprung portions of the vehicle for lateral swinging movement about a longitudinal axis passing substantially through the center of gravity of the whole of said sprung portion when the vehicle is normally loaded, whereby lateral swinging movement of said sprung portion as the vehicle rounds a curve is minimized.

2. In a motor vehicle consisting of sprung and unsprung portions, the combination with spring suspension means adjacent the forward and rearward ends of the vehicle, of connections between said means and the unsprung and sprung portions of the vehicle, said connections being so constructed and disposed as to support the sprung portions of the vehicle for lateral swinging movement about a longitudinal axis generally coincident with the center of gravity line of the whole of said sprung portion when the vehicle is normally loaded, whereby lateral swinging movement of said sprung portion as the vehicle rounds a curve is minimized.

3. In a motor vehicle consisting of sprung and unsprung portions, the combination with spring suspension means adjacent the forward and rearward ends of the vehicle, of connections between said means and the unsprung portion of the vehicle, and connections between said means and the sprung portion of the vehicle in a plane perpendicular to the longitudinal vertical plane of the vehicle and extending closely adjacent to the general longitudinal center of gravity line of the whole of the sprung portion when the vehicle is normally loaded, whereby sidesway is reduced to a minimum.

4. In a motor vehicle consisting of sprung and unsprung portions, the combination with spring suspension means adjacent the forward and rearward ends of the vehicle, of connections between said means and the unsprung and sprung portions of the vehicle, said connections being so constructed and disposed as to support the sprung portions of the vehicle for lateral swinging movement about a longitudinal axis passing substantially through the center of gravity of the whole of said sprung portion when the vehicle is normally loaded, whereby lateral swinging movement of said sprung portion as the vehicle rounds a curve is minimized, said spring suspension means including transverse leaf springs disposed generally in a plane perpendicular to the longitudinal vertical plane of the vehicle and substantially coincident with the longitudinal center of gravity line of the vehicle.

5. In a motor vehicle, the combination with a sprung mass including a vehicle frame, body, and motor, of means yieldingly supporting said mass for vertical movement, said means including a transverse leaf spring assembly disposed adjacent the rear of the vehicle and a spring disposed adjacent the forward end of the vehicle, said springs being connected with said mass substantially on the general center of gravity line thereof when the vehicle is normally loaded.

6. In a motor vehicle, the combination with a sprung mass including a vehicle frame, body, and motor, of means yieldingly supporting said mass for vertical movement, said means including transverse leaf spring assemblies disposed adjacent the forward and rearward ends of the vehicle and lying generally in a common plane perpendicular to the longitudinal vertical plane of the vehicle and passing substantially through the center of gravity of said sprung mass when the vehicle is normally loaded.

RUDOLF SLABY.